1 US009216533B2

(12) United States Patent
Chen et al.

(10) Patent No.: US 9,216,533 B2
(45) Date of Patent: Dec. 22, 2015

(54) ENERGY SAVING DEVICE FOR ACCELERATED PRESSURIZATION IN INJECTION MOLDING MACHINE

(71) Applicants: Nan-Chi Chen, Xiushui Township, Changhua County (TW); Wang-Chun Chen, Xiushui Township, Changhua County (TW); Chien-Hung Chen, Xiushui Township, Changhua County (TW)

(72) Inventors: Nan-Chi Chen, Xiushui Township, Changhua County (TW); Wang-Chun Chen, Xiushui Township, Changhua County (TW); Chien-Hung Chen, Xiushui Township, Changhua County (TW)

( * ) Notice: Subject to any disclaimer, the term of this patent is extended or adjusted under 35 U.S.C. 154(b) by 0 days.

(21) Appl. No.: 14/285,692

(22) Filed: May 23, 2014

(65) Prior Publication Data

US 2015/0336317 A1    Nov. 26, 2015

(51) Int. Cl.
 *B29C 45/73*   (2006.01)
 *B29C 45/77*   (2006.01)
(52) U.S. Cl.
 CPC ............. *B29C 45/77* (2013.01); *B29C 45/7312* (2013.01)
(58) Field of Classification Search
 CPC .................................................. B29C 45/7312

USPC ......... 425/547, 548, 549; 264/328.14, 328.16
 See application file for complete search history.

(56) References Cited

U.S. PATENT DOCUMENTS

| | | | |
|---|---|---|---|
| 2002/0079620 A1* | 6/2002 | Dubuis et al. ............ | 264/328.14 |
| 2003/0064128 A1* | 4/2003 | Byrnes ........................ | 425/552 |
| 2005/0053691 A1* | 3/2005 | Gabriel ....................... | 425/552 |
| 2007/0104822 A1* | 5/2007 | Okabe ......................... | 425/550 |
| 2010/0297287 A1* | 11/2010 | Neter et al. ................. | 425/552 |
| 2011/0052748 A1* | 3/2011 | Neter et al. ................. | 425/552 |
| 2013/0177666 A1* | 7/2013 | Hammond et al. .......... | 425/547 |
| 2013/0224327 A1* | 8/2013 | Altonen et al. .............. | 425/552 |
| 2013/0334727 A1* | 12/2013 | Mine et al. .................. | 264/139 |

* cited by examiner

*Primary Examiner* — Tim Heitbrink
(74) *Attorney, Agent, or Firm* — Alan D. Kamrath; Kamrath IP Lawfirm, P.A.

(57) ABSTRACT

An energy saving device for accelerated pressurization in an injection molding machine includes a mold needing vapor and cooled water or oil in an injection molding process. The cooled water or oil is provided by a pump, followed by connecting to the mold through a water or oil supply pipeline. The interior of the accelerated pressurization energy saving pipe is a through hole. Three or more spiral grooves are provided on the inner peripheral surface of the through hole and having an angle rotated in a front direction, with the lateral direction of each spiral groove having an inclined angle. The vapor or water or oil enforces angle rotation and inclined angle accelerated pressurization.

2 Claims, 6 Drawing Sheets

ENERGY SAVING DEVICE FOR ACCELERATED PRESSURIZATION IN INJECTION MOLDING MACHINE

BACKGROUND OF THE INVENTION

1. Field of the Invention

The present invention relates to the technical field of injection molding machines and, more particularly, provides an energy saving device for accelerated pressurization in an injection molding machine, which may concatenate one or more energy saving pipes for accelerated pressurization on pipelines, and which may provide a mold with vapor, water, oil, backflow, or loopback pipelines. Said energy saving pipe for accelerated pressurization allows the generation of accelerated pressurization of vapor or water or oil for more efficient thermal transfer to achieve the effect of energy saving.

2. Descriptions of Related Art

As age advances, many products are made of plastics. However, injection molding machines are utilized to a large proportion for plastic molding techniques. For conventional injection molding machines, plastics are melted into fluids in a boiling manner, followed by pushing fluid plastics with high pressure. Moreover, the front end of a conventional injection molding machine is provided with a mold having a cavity which is filled with fluid plastics under high pressure and followed by cooling for the product to be formed. Nevertheless, the mold itself needs considerable temperature in the process that injects glue solution into the mold. Solidification due to cooling is not allowed before the glue solution is on position. The blocking of evacuated glue solution would result in unsuccessful molding. Furthermore, once all glue solution is on position, cooling to forming has to be performed rapidly. Otherwise, a prolonged time would reduce the efficiency of processing substantially for the production cost to be increased considerably and would adversely impact on market competitiveness.

The thermal energy of the mold comes from the provision of vapor generated by the boiler, while the cooling of the mold comes from water or oil pressurized by the pump. Because the efficiency of temperature increase or decrease is still low, it is still a high energy consuming machine for energy usage effectiveness and does not comply with the present requirement of energy saving.

SUMMARY OF THE INVENTION

It is an objective of the present invention to provide an energy saving device for accelerated pressurization in an injection molding machine, which supplies vapor to a mold by a boiler, and which supplies water or oil to the mold by a pump. One or more accelerated pressurization energy saving pipes are concatenated on pipelines mainly supplying vapor or water or oil to the mold or backflow, loopback, pipelines. The accelerated pressurization energy saving pipe allows the vapor or water or oil to generate accelerated pressurization for more efficient thermal transfer to achieve the effect of energy saving.

In order to achieve the above and other objectives, the present invention provides an energy saving device for accelerated pressurization comprising: an injection molding machine provided with a mold. A quick temperature increase by vapor is necessary for the mold in the process of injection molding for melted glue solution to fill cavities smoothly, followed by lowering temperature of the mold quickly in order for solidification of glue solution. The vapor is generated by boiler heating, followed by being supplied to the mold through a vapor supply pipeline connected thereto. Cooling water or oil are provided by a pump, followed by being supplied to the mold through a water or oil pipeline connected thereto. One or more accelerated pressurization energy saving pipes are mainly concatenated on the vapor supply pipeline, the water or oil supply pipeline or the backflow, loopback pipeline. The interior of said accelerated pressurization energy saving pipe is a through hole. The inner peripheral surface of the through hole is provided with three or more spiral grooves thereon each having an angle rotated in a front direction, and with a lateral direction having an inclined angle. The vapor or water or oil enforces angle rotation and inclined angle accelerated pressurization to output force with the smaller pump and heat by the boiler in order for a quicker cooling rate and better thermal transfer performance.

BRIEF DESCRIPTION OF THE DRAWINGS

Objectives, features, and advantages of the present invention are hereunder illustrated with specific embodiments in conjunction with the accompanying drawings, in which.

DETAILED DESCRIPTION OF THE EMBODIMENTS OF THE INVENTION

Figure 1:
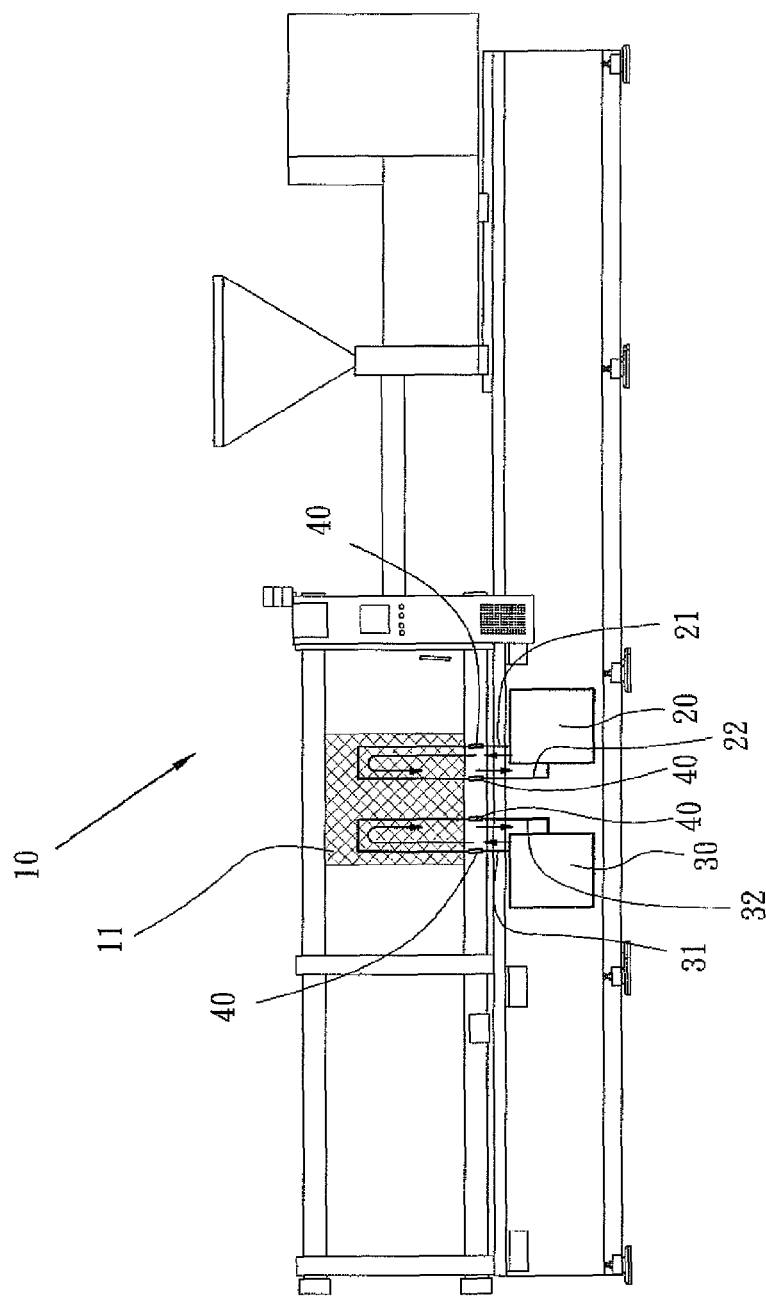
FIG. 1 is a schematic plan of an injection molding machine mold according to an embodiment of the present invention.

Referring to FIGS. 1 to 6, the present invention provides an energy saving device for accelerated pressurization in an injection molding machine. The injection molding machine 10 includes a mold 11 which has to be heated up with vapor in the process of injection molding for a melted glue solution to fill cavities. After that, the temperature of said mold 11 has to be lowered quickly in order for the glue solution to be solidified to a form. The vapor is generated from heating by a boiler 20, followed by being supplied to said mold 11 through a vapor supply pipeline 21 connected thereto. The cooling water or oil are supplied by a pump 30, followed by connecting to said mold 11 through a water or oil supply pipeline 31. Alternatively, one ore more accelerated pressurization energy saving pipes 40 are concatenated on a backflow pipeline 22 and a loopback pipeline 32. Within said accelerated pressurization energy saving pipe 40 is a through hole 41. The inner peripheral surface of the through hole 41 is provided with three or more spiral grooves 42. Each of the spiral grooves 42 has an angle R rotated in the front direction. Each of said spiral grooves 42 has an incline angle θ in the lateral direction thereof. Vapor or water or oil enforces an angle rotation and inclined angle accelerated pressurization for said smaller pump 30 to output force or said boiler 20 to heat in order for a faster cooling rate and better thermal transfer performance.

an injection molding machine 10, at the position for a formed product of which is a mold 11 provided, wherein said mold 11 has to be heated up with vapor in the process of injection molding for melted glue solution to fill cavities. After that, the temperature of said mold 11 has to be lowered quickly in order for the glue solution to be solidified to a form. Wherein, the vapor is generated from heating by a boiler 20, followed by being supplied to said mold 11 through a vapor supply pipeline 21 connected thereto. The cooling water, oil are supplied by a pump 30, followed by connecting to said mold 11 through a water, oil supply pipeline 31, mainly on said vapor pipeline 21 or said water, oil supply pipeline 31. Alternatively, one or more accelerated pressurization energy saving pipes 40 are concatenated on a backflow pipeline 22, loopback pipeline 32. Within said accelerated pressurization energy saving pipe 40 is a through hole 41, on the inner peripheral surface of which is provided with three or more spiral grooves 42. A R angle is rotated in the front direction of each of said spiral grooves 42. Each of said spiral grooves 42 has a θ incline angle in the lateral direction thereof. Vapor or water, oil enforces a R angle rotation and a θ inclined angle accelerated pressurization for each of said spiral grooves 42 for said smaller pump 30 to output force or said boiler 20 to heat in order for faster cooling rate and better thermal transfer performance.

Figure 2:
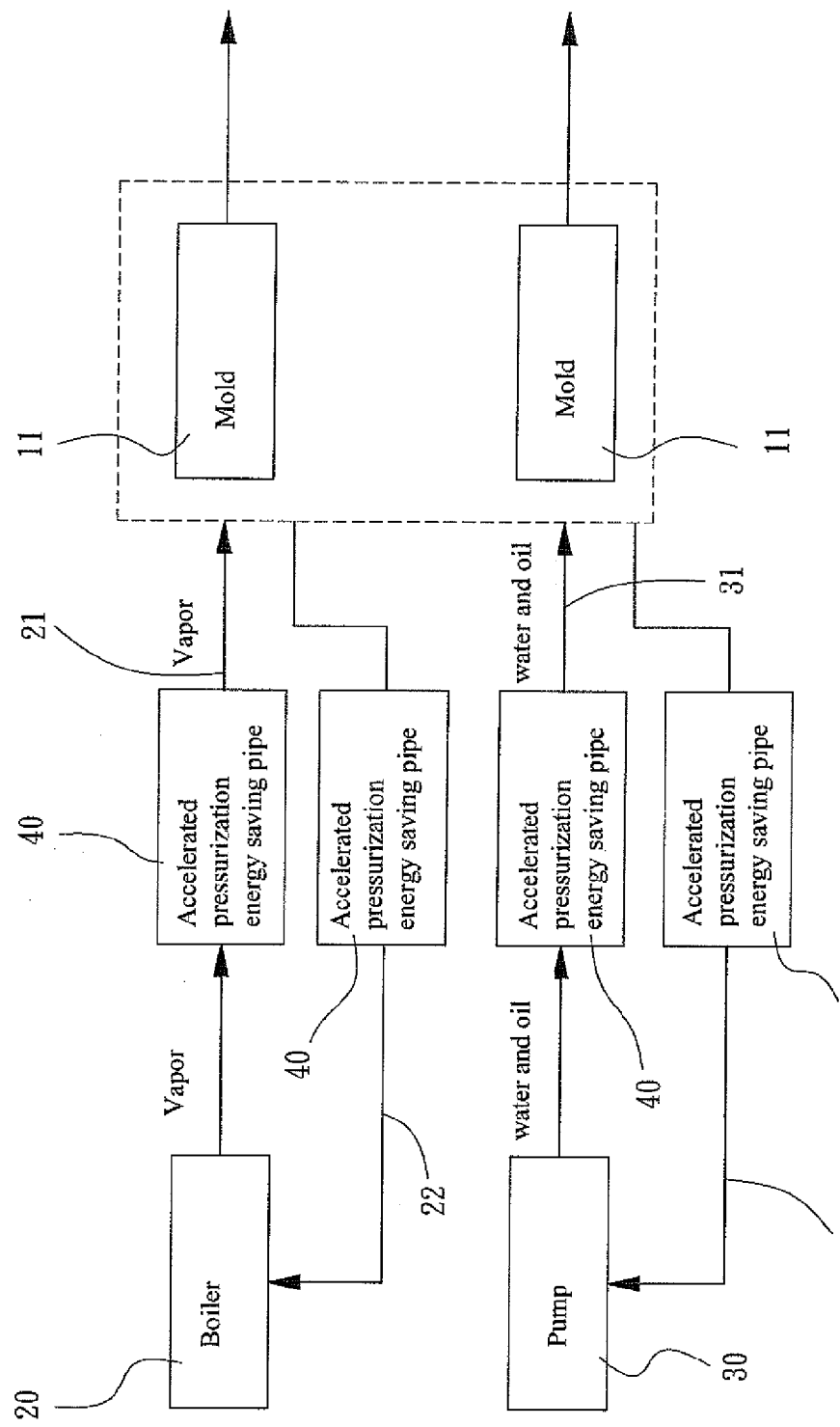
FIG. 2 is a system block diagram of an injection molding machine mold according to the embodiment of the present invention.
Figure 3:
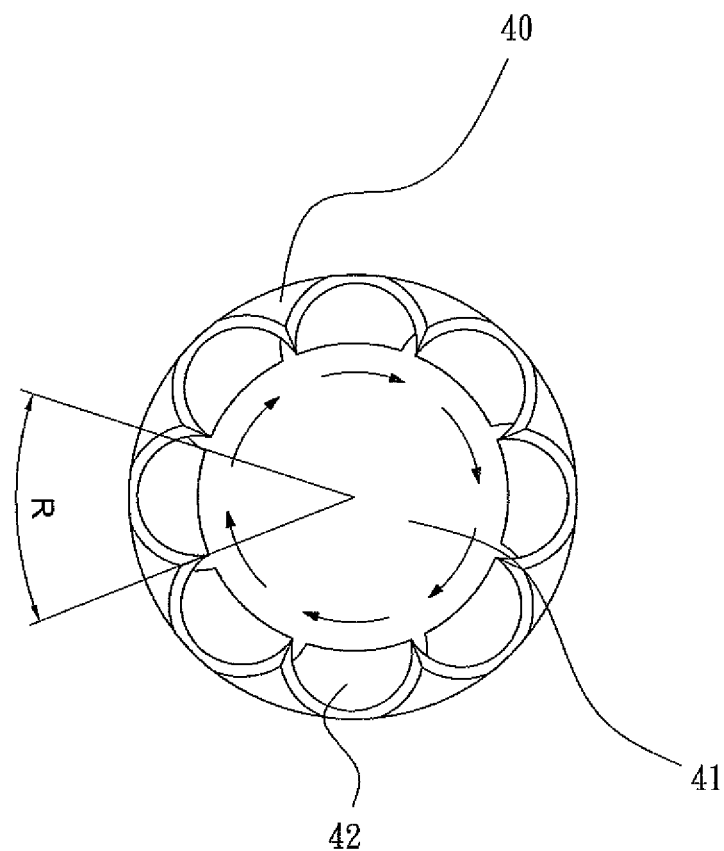
FIG. 3 is a schematic plan in a front direction according to the embodiment of the present invention.
Figure 4:
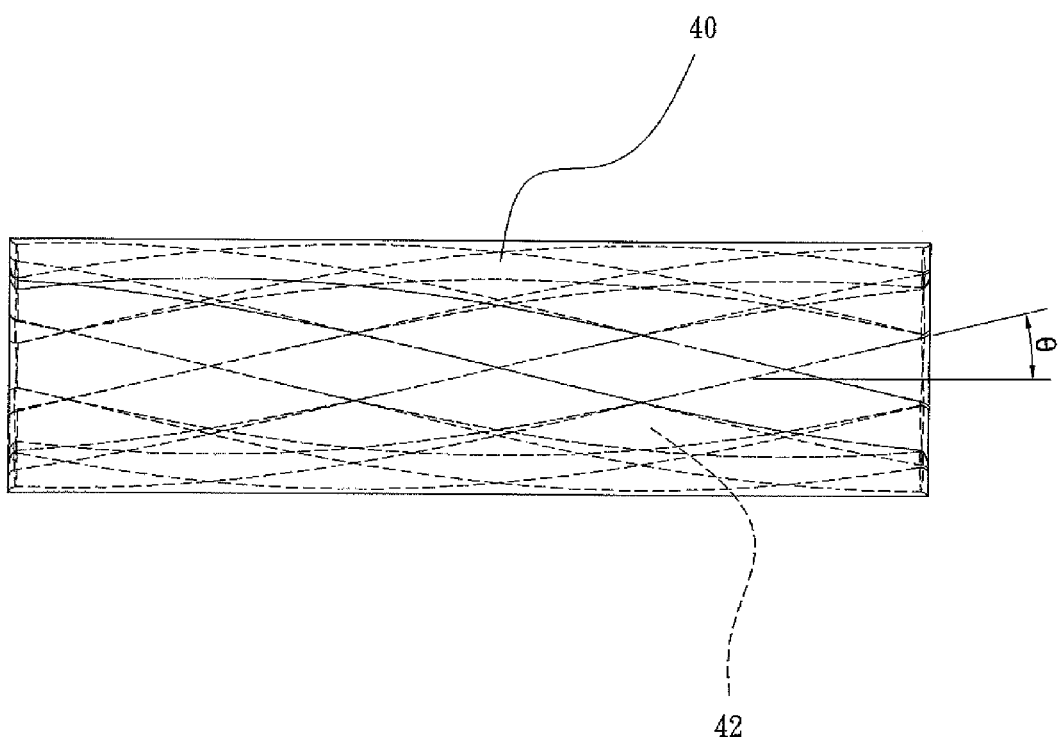
FIG. 4 is a schematic plan in a lateral direction according to the embodiment of the present invention.
Figure 5:
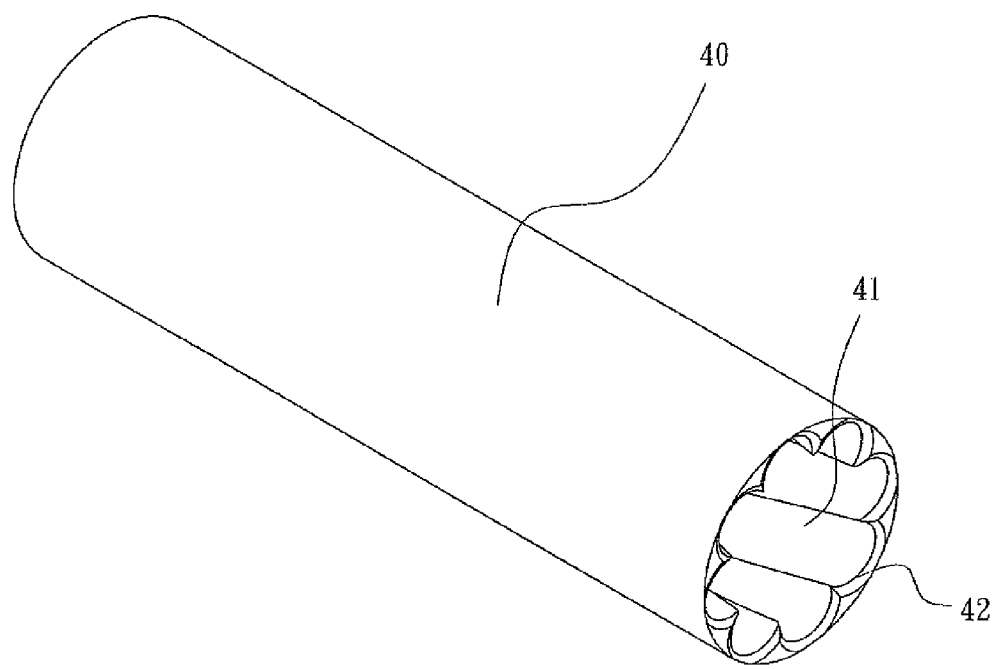
FIG. 5 is a perspective schematic view according to the embodiment of the present invention.
Figure 6:
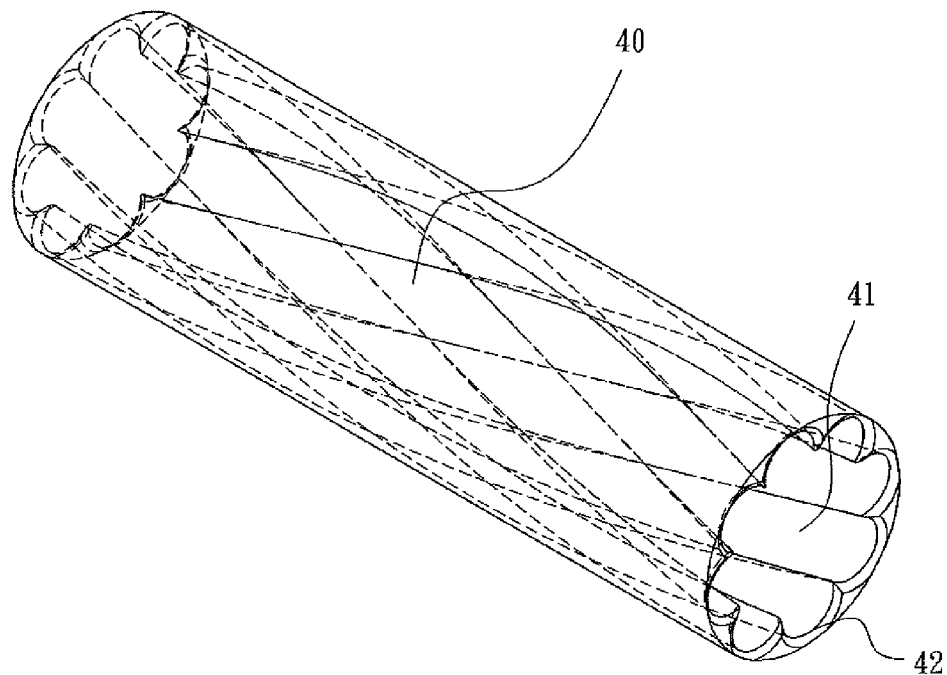
FIG. 6 is a perspective schematic perspective schematic view according to the embodiment of the present invention.

Referring to FIGS. 1, 2, said injection molding machine 10 of the invention is provided with a mold 11 provided with a cold/hot source supply. The hot source part includes a boiler 20 connected with said mold 11 through a vapor supply pipeline 21. Thereby, the vapor from the boiler 20 may be supplied for said mold 11 to use through said vapor supply pipeline 21. The cold source part includes a pump 30 connected to said mold 11 through a water or oil supply pipeline 31. Thereby, the water or oil drawn by the pump 30 may be supplied for said mold 11 to use through said water or oil supply pipeline 31. A backflow pipeline 22 connects said mold 11 to said boiler 20. A loopback pipeline 32 connects said mold 11 to said pump 30.

Referring to FIGS. 1 to 6, on said vapor supply pipeline 21, said water or oil supply pipeline 31, on said backflow pipeline 22, or said loopback pipeline 32 are provided with one or more accelerated pressurization energy saving pipes 40 concatenated. Said accelerated pressurization energy saving pipe 40 is provided with three or more spiral grooves 42. Each of the spiral grooves 42 may enforce vapor or water or oil to rotate, and may perform accelerated pressurization with an inclined angle at the same time in rotation for said smaller pump 30 to output force or said boiler 20 to heat in order for a quicker cooling rate and better thermal transfer performance. Said backflow pipeline 22 and said loopback pipeline 32 may accelerate output speed with said accelerated pressurization energy saving pipe 40 installed to gain kinetic energy for acceleration during gradual degradation of kinetic energy, so that flow is more fluent and efficient.

From the above, the energy saving device for accelerated pressurization in an injection molding machine is innovative in the industry. Furthermore, the effect of energy saving is achieved, and better industrial applicability is compliant by one or more accelerated pressurization energy saving pipes concatenated on the pipelines supplying vapor or water or oil, backflow, or loopback pipelines, and said accelerated pressurization pipes allow vapor or water or oil to generate accelerated pressurization for more efficient thermal transfer.

What is claimed is:

1. An energy saving device for accelerated pressurization in an injection molding machine, comprising:

an injection molding machine provided with a mold, a boiler, a vapor supply pipeline, and a backflow pipeline, with said boiler generating vapor, with said vapor supply pipeline connecting said boiler and said mold, with the vapor supplied to said mold through said vapor supply pipeline, with said backflow pipeline connecting said mold to said boiler;

wherein an accelerated pressurization energy saving pipe is concatenated on said vapor supply pipeline or said backflow pipeline, with an interior of said accelerated pressurization energy saving pipe being a through hole, with three or more spiral grooves provided on an inner peripheral surface of said through hole, with said spiral grooves having an angle rotated in a front direction, with a lateral direction of each of said spiral grooves having an inclined angle, with the vapor enforcing angle rotation and inclined angle providing quick thermal transfer performance.

2. An energy saving device for accelerated pressurization in an injection molding machine, comprising:

an injection molding machine provided with a mold, a pump, and a loopback pipeline, with said pump providing cooling water or oil, with a supply pipeline connecting said pump and said mold to convey the cooling water or oil to said mold, with said loopback pipeline connecting said mold to said pump;

wherein an accelerated pressurization energy saving pipe is concatenated on said supply pipeline or said loopback pipeline, with an interior of said accelerated pressurization energy saving pipe being a through hole, with three or more spiral grooves provided on an inner peripheral surface of said through hole, with said spiral grooves having an angle rotated in a front direction, with a lateral direction of each of said spiral grooves having an inclined angle, with the water oil enforcing an angle rotation and inclined angle allowing quick cooling of the injection molding machine.

\* \* \* \* \*